United States Patent [19]

Leeuwestein

[11] Patent Number: 4,784,032

[45] Date of Patent: Nov. 15, 1988

[54] SHEARS FOR ROD MATERIAL

[75] Inventor: Kurt Leeuwestein, Moers, Fed. Rep. of Germany

[73] Assignee: Kocks Technik GMBH & Co., Hilden, Fed. Rep. of Germany

[21] Appl. No.: 940,502

[22] Filed: Dec. 11, 1986

[30] Foreign Application Priority Data

Jan. 10, 1986 [DE] Fed. Rep. of Germany ....... 3601077

[51] Int. Cl.⁴ ............................................ B23D 25/12
[52] U.S. Cl. ........................................ 83/345; 83/674
[58] Field of Search ................................ 83/343–345, 83/673, 674

[56] References Cited

U.S. PATENT DOCUMENTS

| | | | |
|---|---|---|---|
| 868,856 | 10/1907 | Firm | 83/345 |
| 2,592,268 | 4/1952 | Gerbe | 83/345 X |
| 3,084,582 | 4/1963 | Anderson | 83/345 X |
| 3,110,209 | 11/1963 | Takehara | 83/345 X |
| 3,828,636 | 8/1974 | Smith | 83/345 X |

Primary Examiner—Frank T. Yost
Attorney, Agent, or Firm—Buchanan Ingersoll; Alvin E. Ring

[57] ABSTRACT

Shears for dividing and cropping rod-shaped work material (18) which is moving in the longitudinal direction, have two paraxial blade shafts (3) driven in opposite directions, a blade holder (1,2) having at least one blade (6, 7) being rigidly secured to each of said shafts. The cutting edges (14, 15) of the blade project beyond the blade holders and orbit along two circular paths (16, 17) which overlap slightly. In order to prevent, when using this type of shears, the following longitudinal section being bent following cutting, the two blade clearance angles ($\beta$, $\gamma_1$) upstream of the cutting edges (14, 15) at the entry side are equal and the two blade clearance angles ($\beta_1$,$\gamma$) downstream of the cutting edges at the delivery side are also the same size.

2 Claims, 6 Drawing Sheets

SHEARS FOR ROD MATERIAL

The invention relates to shears for dividing and cropping rod-shaped work material which is moving in the longitudinal direction, having two paraxial blade shafts driven in opposite directions and a respective blade holder rigidly secured to each blade shaft and having at least one substantially plate-shaped blade, whereby the cutting edges of the blades, which edges are formed by a side face and a front face inclined at an acute angle thereto, project radially beyond the blade holders and orbit along two circular paths which overlap slightly.

In known rotary shears of this type, the front faces of the two cooperating blades extend, after the work material has been cut through completely, substantially in the same plane as that in which the two axes of rotation of the blade shafts lie. The side faces of the blades thus extend in a radial direction with respect to the blade shafts and they overlap slightly in the region of their cutting edges in order to ensure that the work material is cut through completely. As a result, the clearance angle between the longitudinal axis of the work material and the side face, is 90° for both blades, whereby, in the case of the first blade, this angle is located upstream of the cutting edge to the entry side, and in the case of the other blade, is located beyond the cutting edge to the delivery end. The same applies correspondingly to the second clearance angle, which is formed by the longitudinal axis of the work material and the front face of the blade. This clearance angle is considerably smaller than 90° because the front faces of the blades extend at an angle to the run-through axis of the work material, in particular when the side faces of the two blades are almost in the plane of the rotary axes of the blade shafts.

As a result of the above-described arrangement of the blades on the blade holders, the side and front faces of the blades as well as the above-mentioned angles, using these known rotating shears stress the work material asymmetrically during the cutting process to a considerable extent, which makes the leading end section of the work material distinctly bent following cutting. As the stressing of the work material exceeds the elastic range and because such shears usually cut red hot work material whose elasticity is considerably lowered, this curvature remains even after the cutting operation has been completed. If the leading end section of the work material is bent in this way, this can often cause problems in conveying it, as it may bump against something and either remain stuck or even leave its desired path. Even if this does not happen, the bent leading section of the work material still bumps against the guides, rolls, roller table rolls, etc., which leads to increased wear and damage to these parts. If the work material is further processed, for example preturned, after cutting, further difficulties are caused if the bent leading end sections of the work material are not first straightened or cut off. Both these possibilities are expensive, because relatively short bent leading end sections of work material cannot be straightened using a normal straightening machine for elongated work material. Additional straightening or cutting off of these bent leading end sections involves considerably greater expense and loss of useful material, particularly in the case of high-grade, expensive materials. If the bent leading end sections of the work material are preturned without being straightened, then they interfere with the preturning process considerably, as the tools constantly separate from the cut and have to enter to cut again. Furthermore, the bent leading end sections of the work material still cannot be used after preturning, as their cross section is asymmetrical and does not have the desired dimensions.

It is an object of the invention to provide rotary shears using which the work material remains straight folowing cutting.

Accordingly, the present invention provides shears for dividing and cropping rod-shaped work material which is moving in a longitudinal direction, comprising two paraxial blade shafts driven in opposite directions and a blade holder rigidly secured to each blade shaft and having thereon at least one substantially plate-shaped blade each blade having a cutting edge which is formed by a side face and a front face inclined at an acute angle thereto and which projects radially beyond the respective blade holder such that the cutting edges orbit along two circular paths which overlap slightly, the blades being secured to their respective holders so that the two clearance angles of the two blades located upstram of the cutting edges at the entry side are substantially equal to one another and the two clearance angles located downstream of said cutting edges at the delivery side are substantially equal to one another, such clearance angles being the angles fromed between the longitudinal axis of the work material and the side or front faces of the blades, as the case may be.

This applied to all positions of the two cooperating, rotating blades in particular to the position in which the work material is completely cut through and the cutting edges of the two blades overlap slightly. The uniformity in angle size in accordance with the invention is achieved by the fact that, in this position, the side faces of the blades no longer lie in the plane of the rotary axes, but at an appreciable angle thereto. This can be achieved by designing the blade holders accordingly, although alternative designs are possible. It is of crucial importance that, for example at the entry side of the cutting edges of the two blades, the angle between the longitudinal axis of the work material on the one hand and the side or front face of the blades on the other hand is the same size. This should also apply to the corresponding angles at the delivery side of the cutting edges of the blades. At the same time, it is not absolutely necessary for the size of the angle at the entry side to be the same as the size of the angle at the delivery side. In a preferred embodiment of the invention, however, the clearance angle located upstream of the cutting edges at the entry side is the same for each blade as the clearance angle beyond the cutting edges at the delivery side.

The invention is further described, by way of example, with reference to the accompanying drawings, in which.

Figure 1:
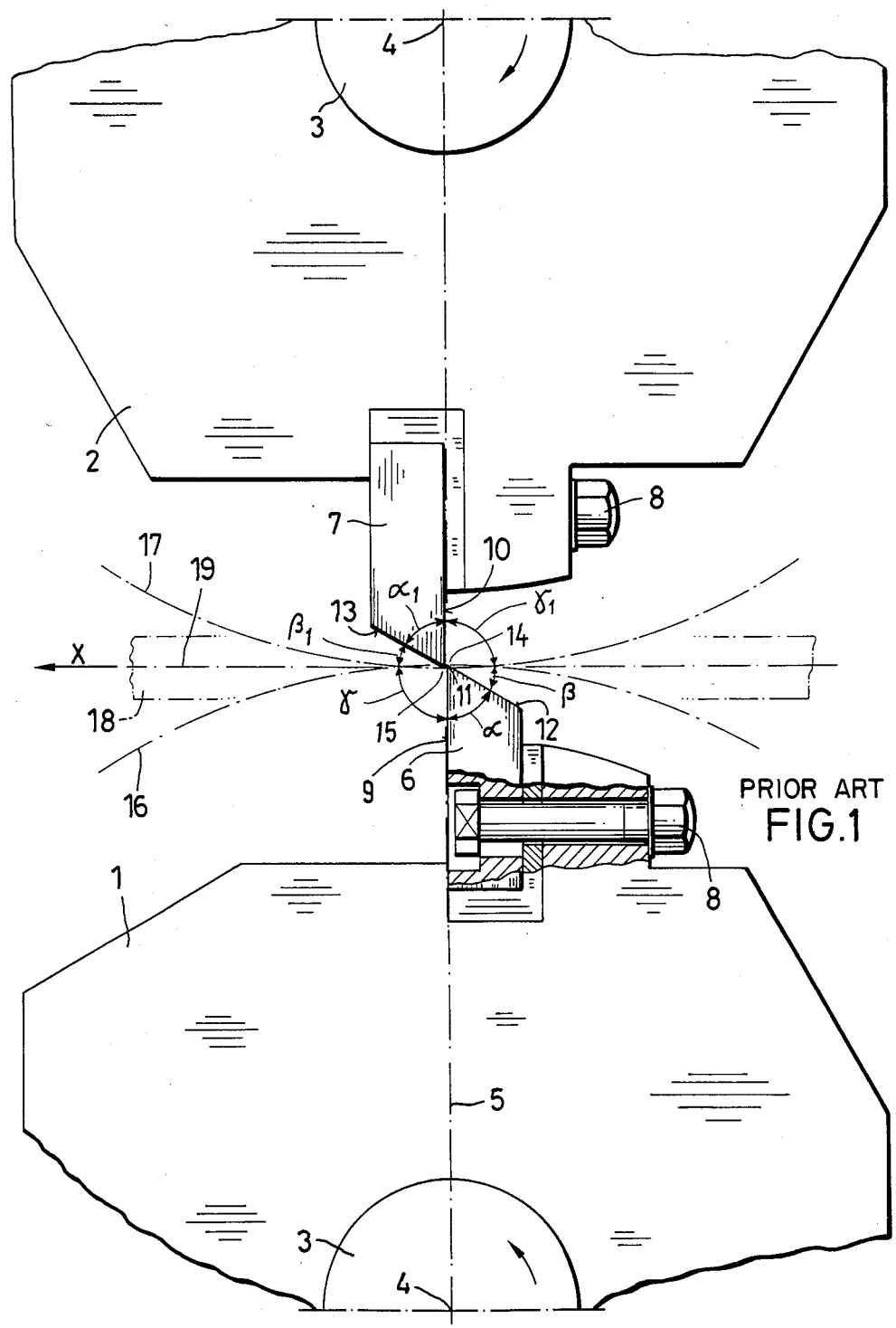
FIG. 1 is a side view of the blades and blade holders of known rotary shears.

FIG. 1 shows two blade holders 1 and 2, which are rigidly disposed on axially parallel blade shafts 3 driven in opposite directions. A rotational axis plane 5 extends through the rotary axes 4 of the blade shafts 3 perpendicular to the plane of drawing and is shown by a dot-dash line. By means of screws 8, a first blade 6 is secured to the lower blade holder 1 and a second blade 7 is secured to the upper blade holder 2. The blade holders 1 and 2 may be provided with further blades 6 and 7 (not shown) about their peripheries.

The blades 6 and 7 have the same form which is substantially plate-shaped. The larger side faces 9 and 10 of each blade, with the blades in the position shown in FIG. 1, lies almost in the plane 5 of the rotary axes, with only a very small clearance 11 being provided in order to prevent the blades 6 and 7 from touching one another. Front faces 12 and 13 of the blades 6 and 7 confront one anther and are disposed at an acute angle of $\alpha$ or $\alpha_1$, respectively, to the side faces 9 and 10 to form cutting edges 14 and 15. The cutting edges 14 and 15 of the two blades 6 and 7 project beyond the blade holders 1 and 2 in the radial direction and orbit along two circular paths 16 and 17 which overlap in the region of the plane 5 of the rotary axes. In this manner it is ensured that work material 18 moving in the direction of the arrow x is cut through completely.

The front faces 12 and 13 of the blades 6 and 7 and the longitudinal or run-through axis 19 of the work material 18 form clearance angles $\beta$ and $\beta_1$, respectively, which are the same as one another when the acute angles $\alpha$ and $\alpha_1$ of the blades 6 and 7 respectively are the same. However, they are distinctly less than 90°, for example 30°. Between the longitudinal axis 19 and the side faces 9 and 10 of the blades 6 and 7, the two clearance angles $\gamma$ and $\gamma_1$ are approximately 90°. It can clearly be seen that, in this known construction, the corresponding clearnance angles $\gamma$ and $\gamma_1$ are disposed on opposite sides of the cutting edges 14 and 15, the $\gamma$ clearance angle of the blade 6 being disposed towards the delivery end and the clearance angle $\gamma_1$ of the blade 7 towards the entry end. The converse applies to the two other clearance angles $\beta$ and $\beta_1$ of the blades 6 and 7.

Figure 2:
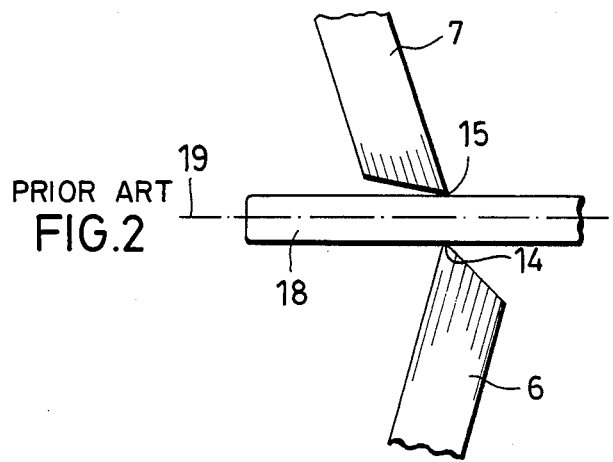
FIGS. 2 to 8 show a cutting operation using the known shears of FIG. 1.
Figure 3:
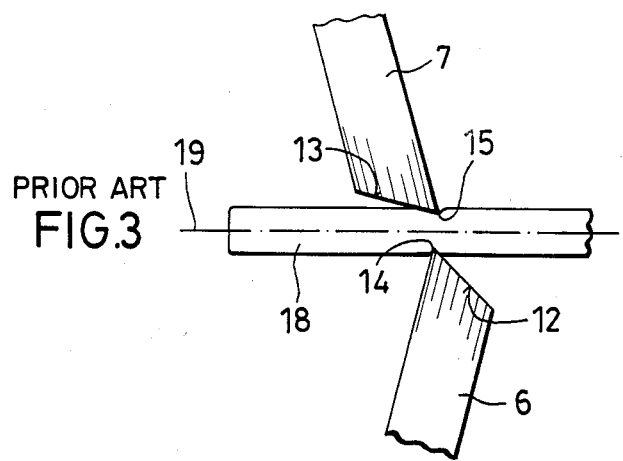
Figure 4:
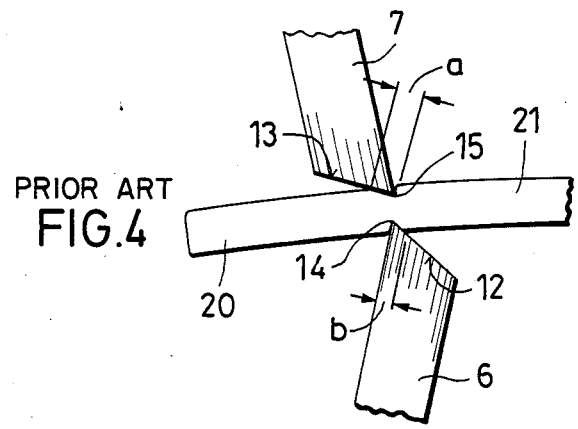
Figure 5:
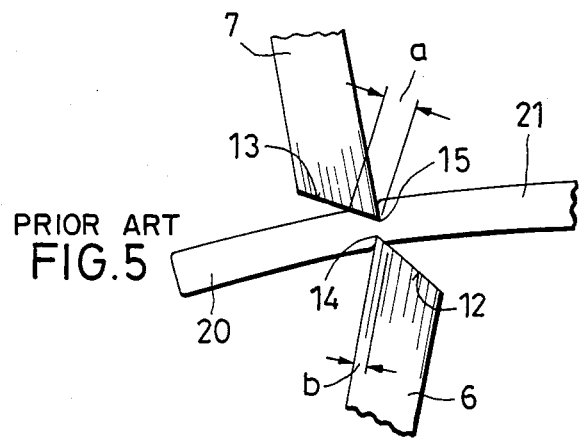
Figure 6:
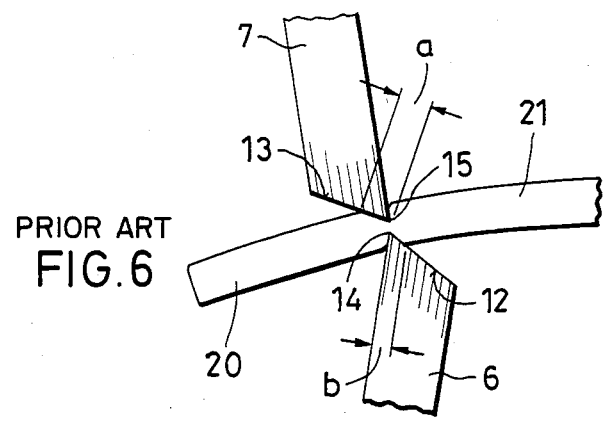
Figure 7:
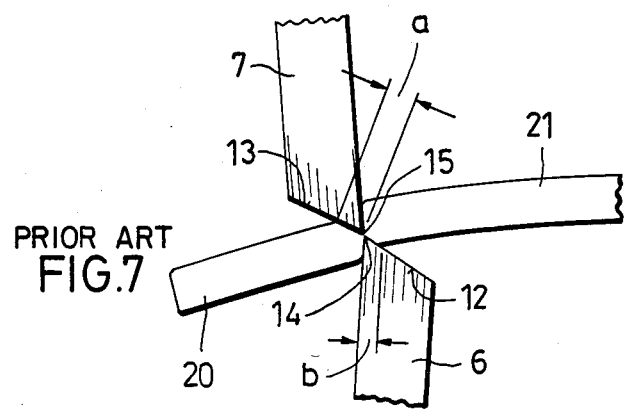
Figure 8:
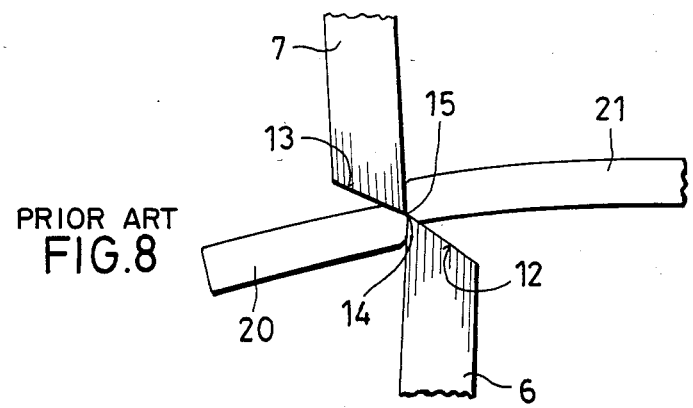

FIG. 2 shows the blades 6 and 7 of the shears shown in FIG. 1 on a different scale and with the blades in a different position. The cutting edges 14 and 15 are just cutting into the surface of the work material 18 at opposite sides, whereby an initially negligible pressure is being exerted on the work material 18 and the work material is still completely straight. In FIG. 3, the cutting edges 14 and 15 have already penetrated more deeply into the work material 18 and are already exerting some cutting pressure on the work material 18 transversely to its longitudinal axis 19. It can already clearly be seen that an increasingly large area of the front face 13 of the upper blade 7 presses on the work material 18 as the cutting edge 15 penetrates further into the work material 18, whereas there is no comparable support on the opposite side. Only the cutting edge 14 of the lower blade 6 serves as a support and is displaced somewhat in the longitudinal direction of the work material 18. The front face 12 of the blade 6 acts as a lower support only on a very narrow strip directly beyond the cutting edge 14. This can be seen even more clearly in FIGS. 4 to 8, which show the cutting edges 14 and 15 penetrating further into the work material 18. The front face 13 bears from above upon the work material 18 with a part a which is considerably wider than the part b of the front face 12 of the lower blade 6. This results in forces or bending moments which not only press downwards the leading longitudinal section 20 of the work material 18 to be separated, but also above all bend the following longitudinal section 21 distinctly downwards. This bending downwards of the leading longitudinal section 20 to be cut off is largely inconsequential, as said section is cut off and scrapped anyway. What is considerably more disadvantageous is the marked bend in the following leading section 21 of the work material at the entry side of the blades 6 and 7, as the leading section 21 of the work material is meant to be used as well, but, because of its curvature, this is not possible without the use of additional, expensive measures. FIG. 8 shows that, even if the two blades 6 and 7 cut through the work material 18 and almost reach the position shown in FIG. 1, the following longitudinal section 21 is considerably bent and can no longer elastically recover its original straight form. The main cause of the unwanted curvature of the following leading section 21 of the work material is the fact that, in the case of these known shears, the clearance angle $\beta$ at the entry side of the blade 6 is considerably smaller than the angle $\alpha_1$ disposed at the entry side of the blade 7, and because the clearance angle $\beta_1$ on the blade 7 at the delivery side is also considerably smaller than the angle $\gamma$, which is also on the delivery side of the blade 6. The result is asymmetry in the cutting region, which asymmetry is more pronounced the deeper the cutting edges 14 and 15 penetrate into the material 18.

Figure 9:
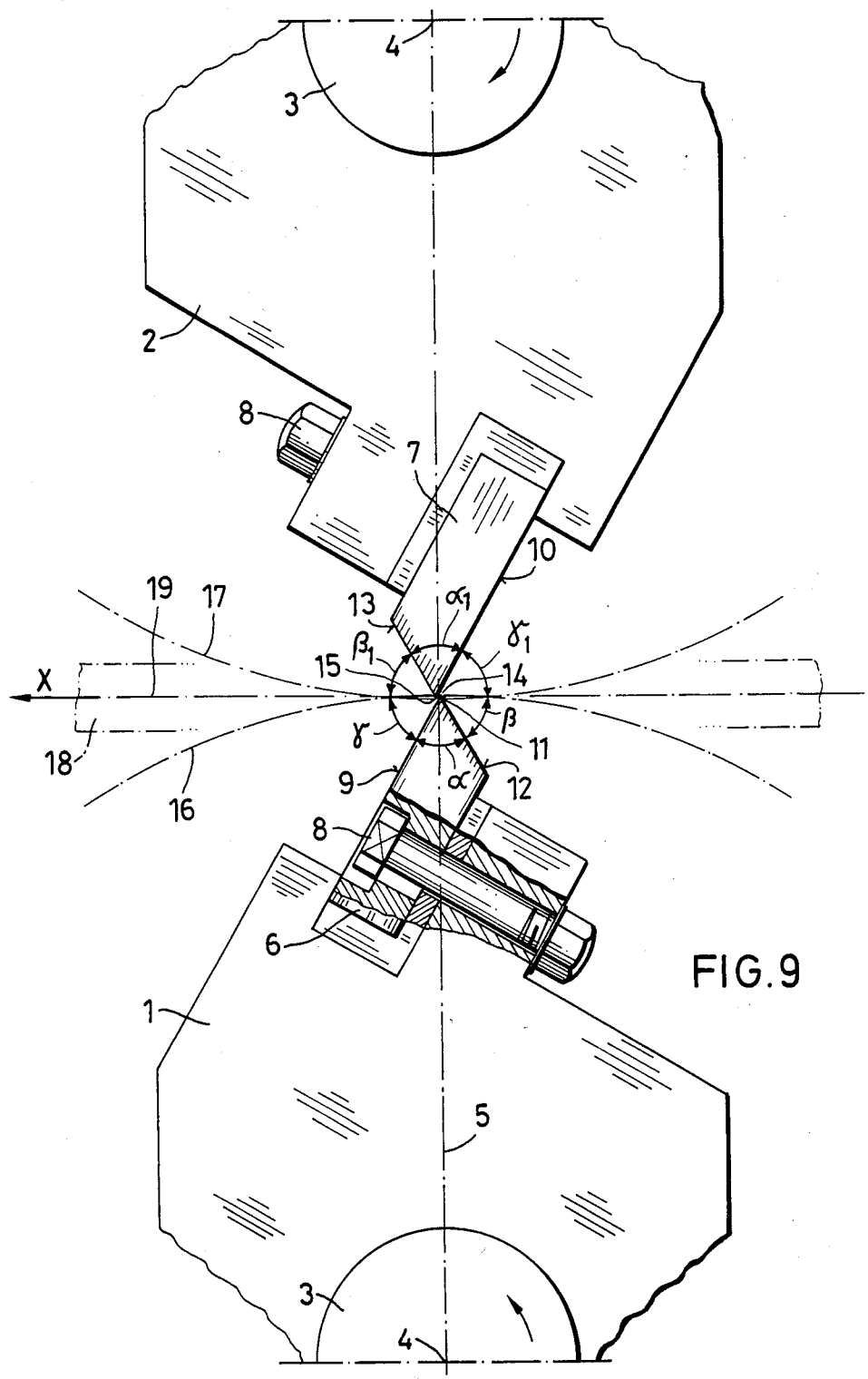
FIGS. 9 and 10 are side views of two embodiments of the shears according to the invention.

FIG. 9 shows shears according to the invention which correspond in part to those in FIG. 1, so that there is no need for a detailed description. The differences between these shears and the known shears shown in FIG. 1 are that the blades 6 and 7 no longer extend radially with respect to the axes 4 of the rotation of the blade shafts 3 and that their side faces 9 and 10 no longer lie in the plane 5 of the axis of rotation, nor do they extend parallel thereto and at a small distance therefrom, but rather are disposed at a significant acute angle thereto. This inclination is selected such that the angles $\beta$ and $\gamma_1$ at the entry side are the same size, as are the angles $\beta$ and $\gamma_1$ at the delivery side. In the embodiment shown in FIG. 9, the angles $\beta$ and $\gamma$ are also the same size, as are the angles $\beta_1$ and $\gamma_1$. The latter does not necessarily have to be the case, but does offer some advantages, such that this choice of angle is preferred.

Figure 10:
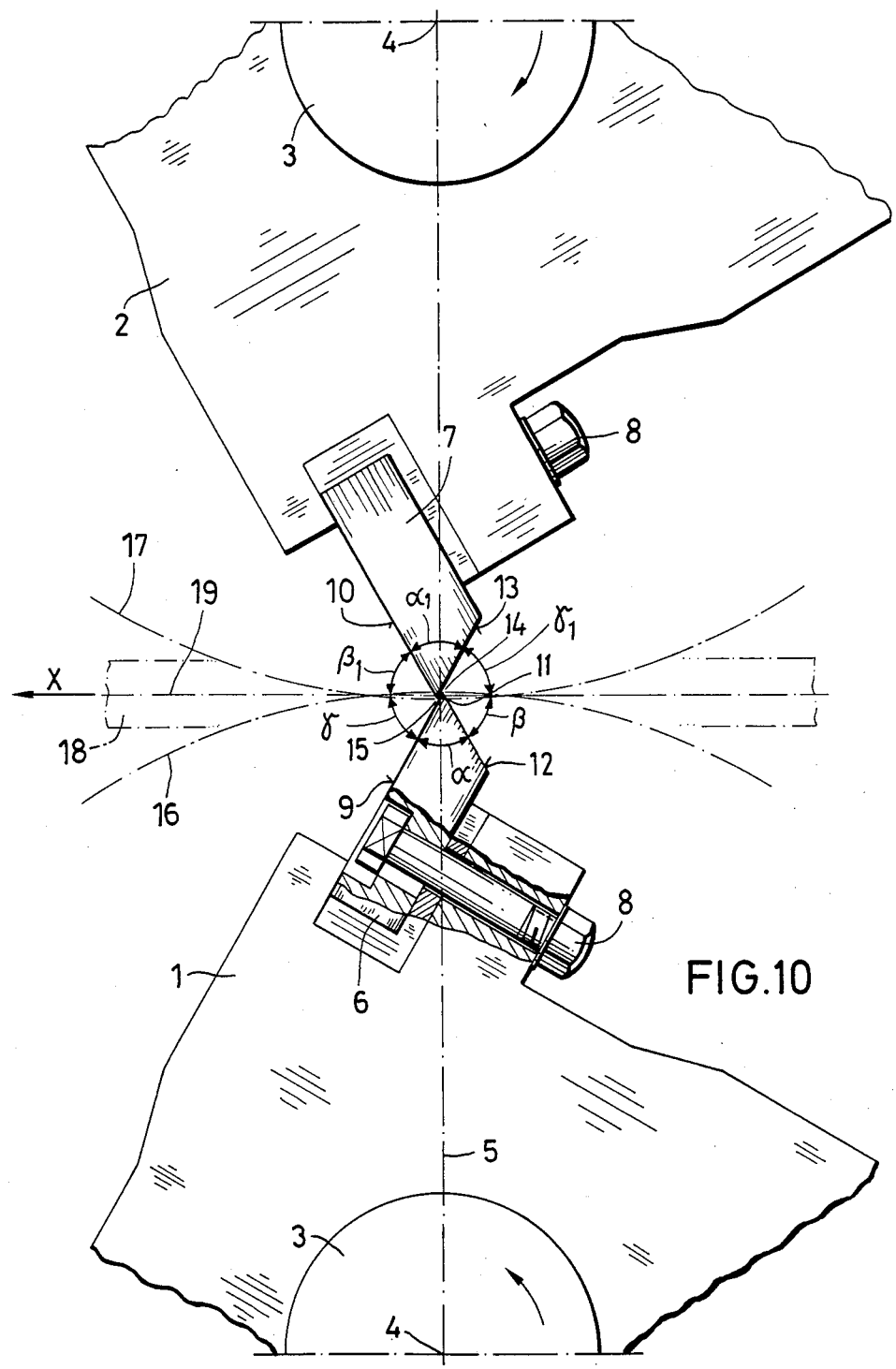

FIG. 10 shows an embodiment which corresponds substantially to the embodiment in FIG. 9. The difference is merely that, in the embodiment shown in FIG. 10, both front faces 12 and 13 of the two blades 6 and 7 are disposed at the entry side, and that both side faces 9 and 10 of the two blades 6 and 7 are located at the delivery side of the cutting edges 14 and 15.

Reference is also made to the face that other forms of blades may be used, for example with the front faces 12 and 13 being V-shaped. In this case, too, the angles selected in accordance with this invention can also be used.

I claim:

1. Shears for dividing and cropping rod-shaped work material which is moving in a longitudinal direction, comprising two paraxial blade shafts driven in opposite directions and a blade holder rigidly secured to each blade shaft, and having therein at least one substantially plate-shaped blade, each blade having a cutting edge which is formed by a side face and a front face inclined at an acute angle thereto and which projects radially beyond the respective blade holders such that the cutting edges orbit along two circular paths which overlap slightly, the blades being secured to their respective holders so that in all positions of orbit the two clearance angles of the two blades located upstream of the cutting edges at the entry side are substantially equal to one another and the two clearance angles located downstream of said cutting edges at the delivery side are substantially equal to one another, such clearance angles being the angles formed between the longitudinal axis of the work material and the side or front faces of the blades, as the case may be.

2. Shears as claimed in claim 1, in which for each blade, in all positions of orbit the clearance angle located upstream of the cutting edge at the entry side is the same as the clearance angle beyond the cutting edge at the delivery side.

* * * * *